United States Patent [19]

Ring

[11] Patent Number: 5,057,649
[45] Date of Patent: Oct. 15, 1991

[54] ELECTRICAL WIRING BOX

[76] Inventor: Gerard W. Ring, Rte. 1, Box 140A, Bryon, Minn. 55920

[21] Appl. No.: 472,113

[22] Filed: Jan. 30, 1990

[51] Int. Cl.[5] .......................................... H01R 13/502
[52] U.S. Cl. ..................................... 174/53; 411/437; 411/523
[58] Field of Search .......................... 174/53; 220/3.2; 411/437, 522, 523

[56] References Cited

U.S. PATENT DOCUMENTS

| 3,876,821 | 4/1975 | Pringle | 174/53 |
|---|---|---|---|
| 4,167,648 | 9/1979 | Lockwood | 174/53 |
| 4,424,405 | 1/1984 | Nattel | 174/53 |
| 4,642,420 | 2/1987 | Nattel | 174/53 |
| 4,843,189 | 6/1989 | Jorgensen et al. | 174/53 |
| 4,936,396 | 6/1990 | Lockwood | 174/53 |

Primary Examiner—Leo P. Picard
Assistant Examiner—David A. Tone
Attorney, Agent, or Firm—William J. Ryan

[57] ABSTRACT

An electrical wiring box for mounting an electrical device therein by means of push inserted screws is provided. The box is defined in part by a pair of parallel spaced sidewalls and a pair of parallel spaced end walls. A mounting bracket is formed on each end wall for the snap mounting of a resilient screw receiving spring clip. Each spring clip is formed of a strip of resilient metal bent to define a base portion, upwardly disposed side portions and inwardly disposed top portions, such that the ends of the strip are positioned adjacent one another. The ends of the top portions are bent downwardly and inwardly of the clip to define a spring receiving space therebetween. The base portion has a spring receiving opening defined by a pair of downwardly bent tabs which is aligned with the space defined by the ends of the strip. In operation the spring clips are snapped into engagement with the respective brackets and the electrical device positioned within the wiring box for mounting. Mounting screws are inserted through mounting holes in the electrical device and then pushed through the space between the top portions of the clip and the opening of the bottom portion of the clip whereupon the ends of the clip and the tabs engage the screw so as to prevent its withdrawal.

4 Claims, 4 Drawing Sheets

ELECTRICAL WIRING BOX

SUMMARY OF THE INVENTION

The present invention relates to a structure for attaching electrical devices such as switches or receptacles to electrical wiring boxes.

Currently, electrical devices are attached to wiring boxes by means of screws. The present wiring boxes typically define female threaded portions spaced at opposite ends of the box. The electrical device to be mounted in the box typically carries a pair of mounting brackets extending on each side of the device, each of which define an opening. The device is positioned within the box such that the openings overlie the female threaded portions and a mounting screw is inserted through each opening into the corresponding female threaded portion. The screws engage the female threaded portions and are tightened by rotation to secure the device in the box.

It is desirable that cover plates placed over the wiring box after the installation of the electrical device be square with the sidewall and floor. The external portions of the electrical device must project far enough from the walls so that they are flush with the cover plate upon installation. The external portions should not project so far from the wall that they hold the cover plate from the wall, however.

One problem with current designs is that the correct adjustment of the position of the electrical device can only be determined with the cover plate on. The adjustments must be made with the cover plate off, however. The inexperienced will often have to remove the cover two or three times to get the correct adjustment. Naturally with experience, a professional electrician can be right much of the time. However, they will also make a substantial number of mistakes. In virtually all new construction there will be incorrectly installed devices depending upon the strictness of the inspector and the amount of time the electrician takes to adjust them correctly.

A second problem is the amount of time it takes to attach the device to the box. Many professionals now carry power screwdrivers to speed installation. However, the speed of the power screwdriver decreases the accuracy of the installation and increases the likelihood of stripping the threads from the box as discussed below. While it takes only a few minutes to correctly install a switch or outlet, those minutes become significant when installing a hundred such devices in a home or several hundred in a commercial building.

A third problem with the current technology is that the electrical boxes most commonly used are made of plastic or fiberglass which are often too soft to serve as a fastener. In some cases, stronger material is used to form a tube which is threaded and inserted into the box to hold the screw. Since these materials are also relatively soft, the screws will easily strip out the threads if accidentally overtightened. Further, if stripped, there is no replacement nut or similar device which can be used since the threads are an integral part of the box.

A fourth problem is the expense of production. Threading is a relatively slow process both for steel boxes and their softer counterparts. This naturally translates to increased costs in production.

Several patents have previously been issued which attempt to address these problems. U.S. Pat. No. 4,424,405 (1984) describes a method of building in a fastener which has greater strength than the plastic box. However, it makes the box considerably more expensive. U.S. Pat. No. 4,642,420 (1987) describes a metal box with a push-insertion fastener built into the box. However, it is limited to metal boxes and must be threaded. It is also formed of the same metal as the box which is too rigid for easy installation. U.S. Pat. No. 4,843,189 describes a fastener which can be inserted into the electrical box during manufacture but which provides less strength, more production costs, and less flexibility in use than this design.

All previous boxes and fasteners have the following disadvantages:

(a) Difficulty of proper adjustment. The cover plate must be removed in order to adjust the device.

(b) Time consuming. Most require a screw to be turned into a hole for fastening.

(c) Threads are easily stripped. The most economical boxes are made of plastic or similar material. Even with threaded inserts of a stronger material, they do not provide sufficient strength to prevent stripping.

(d) If stripped, they have no replaceable nut or similar device to put into the box to hold the device.

(e) Expense of production. Solutions developed to date to speed installation have resulted in higher production costs and are not cost effective.

It is one object of the present invention to provide a quick and simple means of attaching electrical devices to wiring boxes.

It is a further object of the present invention to provide an easy method of adjusting the position of electrical devices during installation.

It is yet another object of the present invention to provide a firmer base for mounting electrical devices in wiring boxes.

To those ends, an electrical wiring box is provided defining means for receiving a pair of screw engaging spring clips, one on each end of said box. Each of such spring clips is designed such that a mounting screw may be engaged simply by pushing it into the clip. Each of said clip receiving means comprises a pair of spaced, parallel surfaces having a centrally defined opening. A pair of screw engaging spring clips are provided, each comprising a metal strip wrapped in a generally rectangular configuration such that each of its opposite ends are positioned adjacent to one another intermediate one side of the rectangle. The ends of the clip are positioned adjacent one another and are bent inwardly to define a space therebetween slightly smaller than the diameter of the mounting screw to be used. Each clip also defines a screw receiving opening opposite of the spaced ends of the clip with a pair of downwardly projecting tabs on opposing sides of such opening, which is also sized slightly smaller than the mounting screw. The clip is snapped over the clip receiving means such that the ends of the clip project into and downwardly from the opening of the top surface. Once the electrical device is in place such that the holes in its mounting brackets are positioned over the opening between the ends of the spring clip, the mounting screw is inserted through such openings and pushed inwardly of the clip until it is in position. When the screw is inserted in this fashion, it will be seen that the opposed ends of the clip and the tabs will be deflected from their normal position to thereby engage in the screw under tension and securely hold it in place.

DETAILED DESCRIPTION OF THE PREFERRED EMBODIMENT

Figure 7:
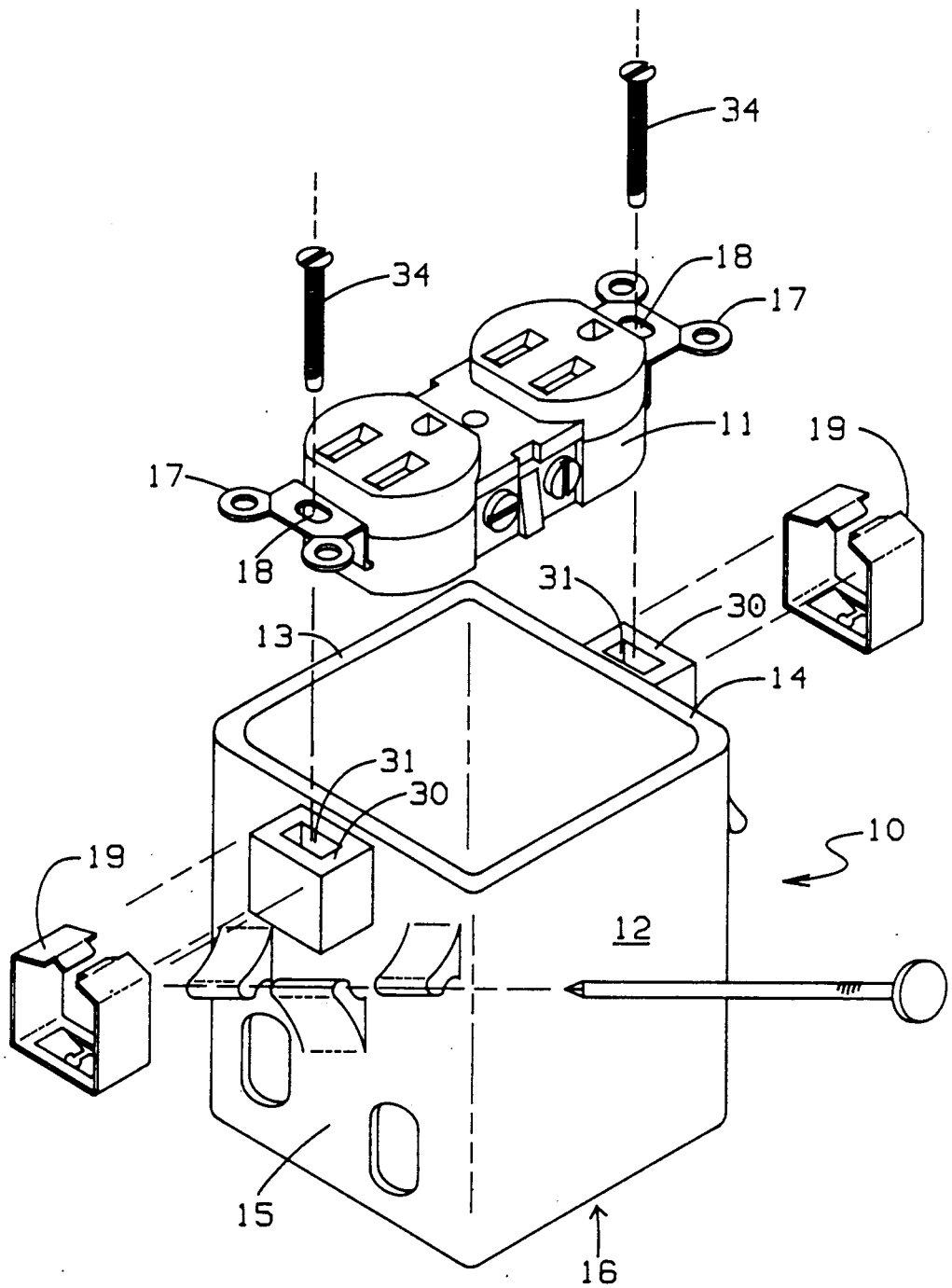
FIG. 7 is an exploded elevational perspective view of one application of the invention in conjunction with a molded electrical wiring box.
Figure 8:
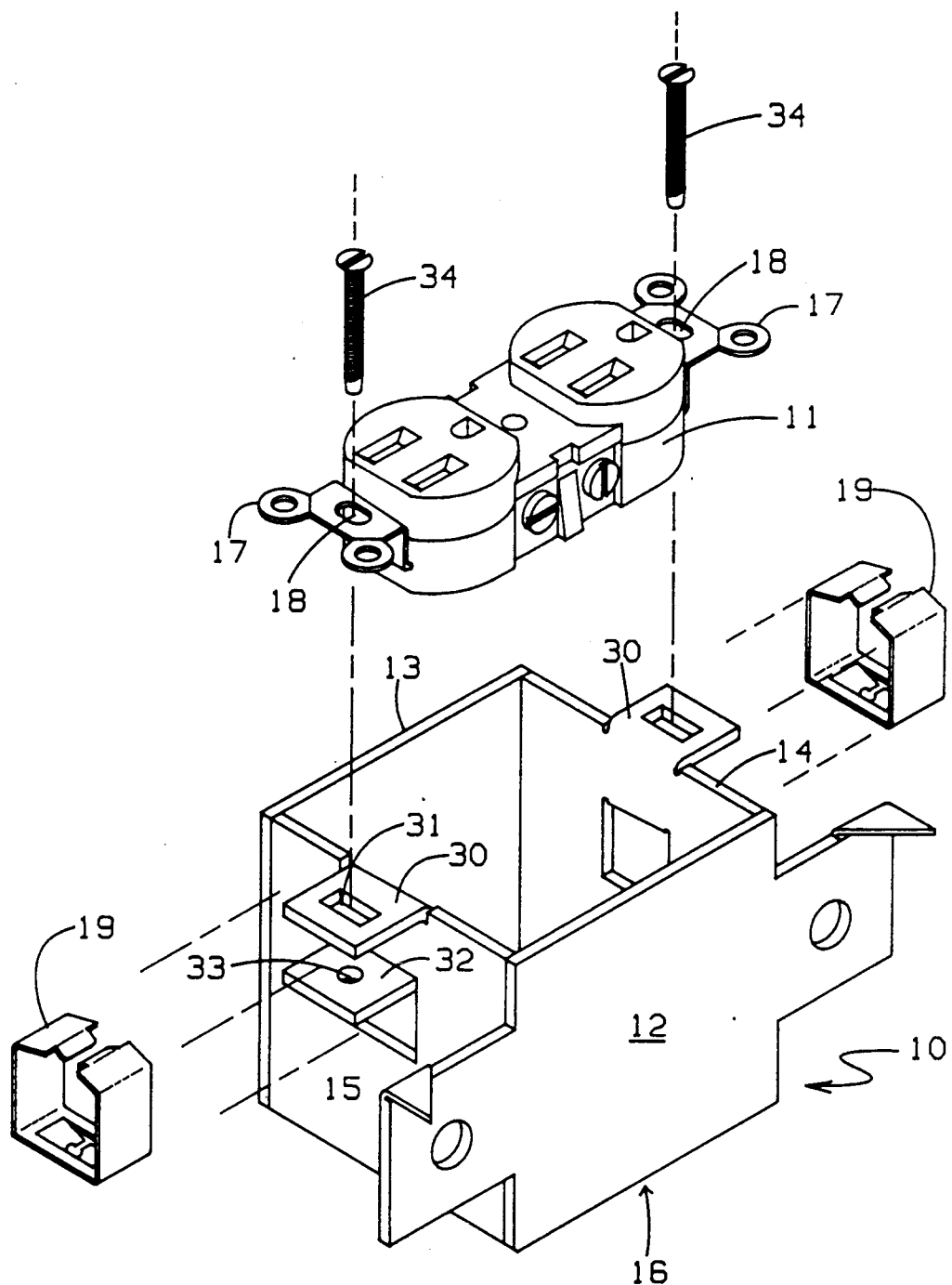
FIG. 8 is an exploded elevational perspective view of another application of the invention in conjunction with a stamped metallic electrical wiring box.
Figure 9:
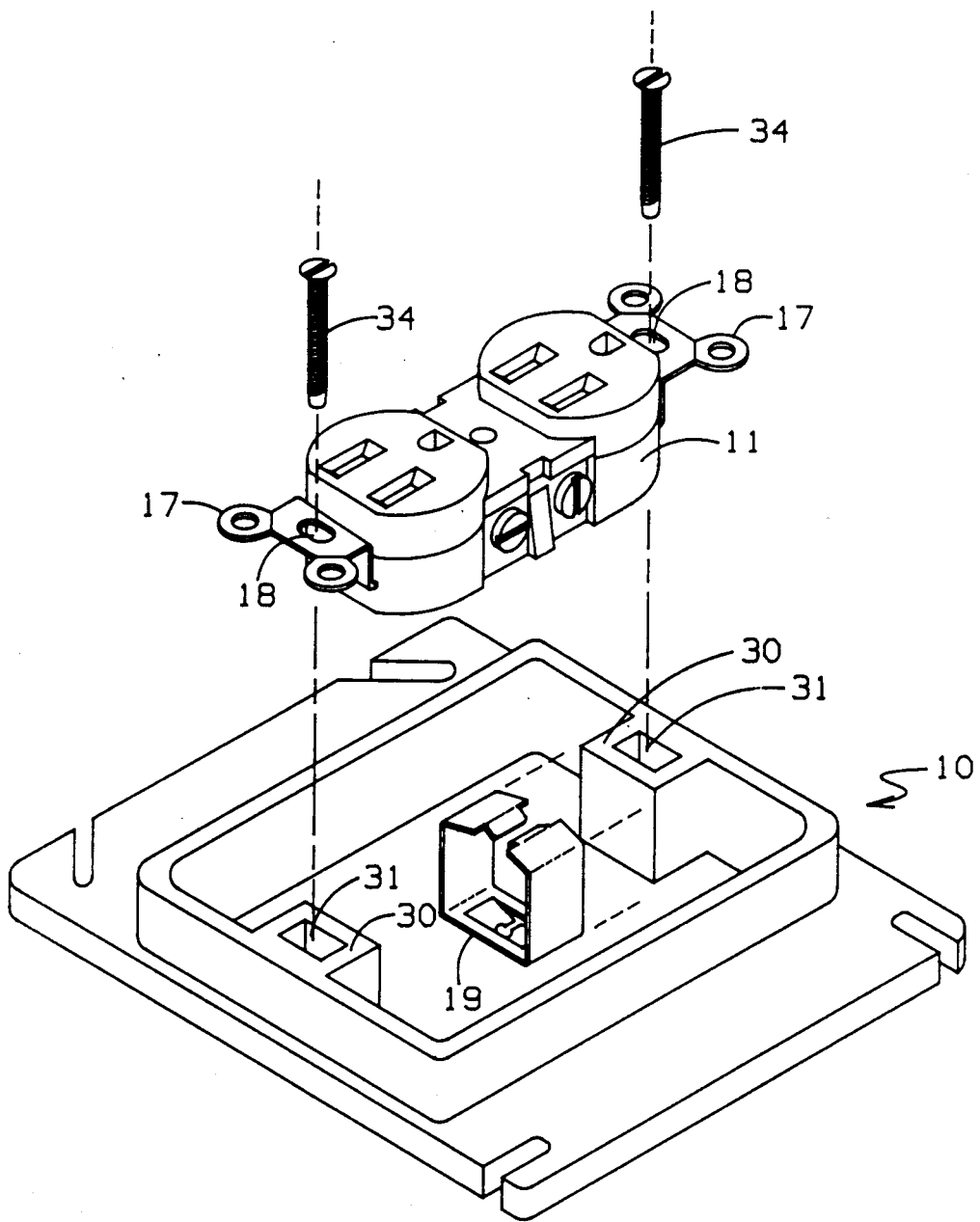
FIG. 9 is an exploded elevational perspective view of yet another application of the invention in conjunction with a third type of electrical wiring box referred to as a "plaster ring."

Referring to the drawing, wherein like numerals represent like elements throughout the several views, there is shown an electrical wiring box generally designated by the numeral 10. The wiring box 10 is generally of the type used to house electrical devices such as switches or outlets. In FIGS. 7, 8 and 9, a duplex outlet 11 is shown although the invention is equally useful in conjunction with any of the known electrical devices used in conjunction with such wiring boxes.

The wiring box 10 comprises spaced sidewalls 12, 13, end walls 14, 15 and backwall 16 thereby defining a box having an open front. In the wiring boxes generally in use today and the electrical device 11 to be secured to the wiring box 10 carries mounting brackets 17 extending from each end which define openings 18. The end walls 14, 15 carry or define female threaded portions adjacent the open face of the box 10. The electrical device is positioned within the open face of the box such that the openings 18 in brackets 17 overlie each of the female threaded portions. The device is mounted to the box by inserting a screw through each opening 18 into engagement with the corresponding female threaded portion. Upon rotation to tighten the screw, the electrical device is secured to the wiring box.

Figure 4:
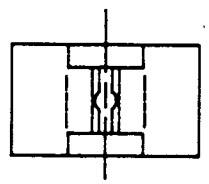
FIG. 4 is a top plan view of the spring clip shown in FIG. 1.
Figure 3:
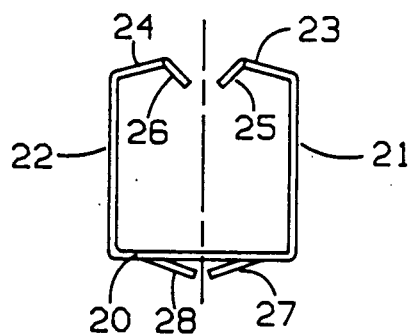
FIG. 3 is a side view of the spring clip shown in FIG. 1.
Figure 2:
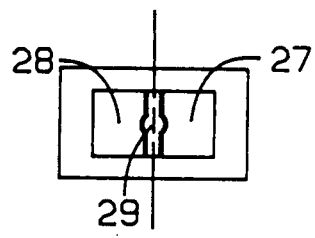
FIG. 2 is a bottom plan view of the spring clip shown in FIG. 1.
Figure 1:
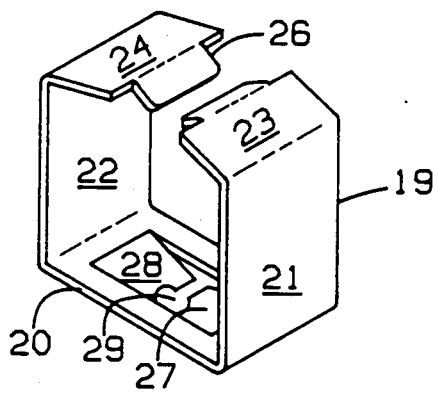
FIG. 1 is an elevational, perspective view of a screw engaging spring clip according to the present invention.

In the present invention, the end walls 14, 15 are provided with means for mounting resilient screw engaging spring clips 19 adjacent the open end of the wiring box 10. The spring clips 19 are illustrated in FIGS. 1 through 4 and comprise a base or bottom portion 20, two upwardly extending side portions 21, 22 joined to the opposite ends of bottom portion 20 and extending generally perpendicularly thereto and two inwardly projecting top portions 23, 24, one of which is attached to each of the side portions 21, 22 oppositely the bottom portion 20. Each of the top portions 23, 24 defines a downwardly and inwardly projecting ear 25, 26 spaced in close proximity to one another as shown in FIG. 3.

The spring clips 19 are preferably formed from a single strip of metal such as steel or some other resilient material such that after deformation of the parts relative to one another within the limits of their intended use, the clip will resume its original shape.

The top portions 23, 24 of the clip 19 are formed at an oblique angle slightly less than perpendicular to the corresponding side portion 21, 22. The ears 25, 26 are bent downwardly and inwardly of the clip 19 such that a small screw receiving space is defined between their ends. The size of the space is slightly less than the diameter of the screws to be used.

The base portion 20 has a pair of downwardly projecting tabs 27, 28 formed therein and defining a screw receiving opening 29 positioned beneath the space between ears 25, 26. Opening 29 is also sized slightly smaller than the diameter of the screw to be used.

The means for mounting the screw engaging spring clips 19 may vary from box to box. FIGS. 7 through 9 show various types of mounting brackets. Common to all is an upper surface 30 having a centrally positioned opening 31, and a bottom surface 32 having a centrally positioned opening 33 located beneath opening 31. Surfaces 30, 32 are maintained essentially parallel to one another and spaced at a distance essentially equal to the distance between the top of the base portion 20 and the bottom of the top portions 23, 24. Opening 31 is preferably rectangular in shape and has dimensions sufficient to snugly receive ears 25, 26 therein. Opening 33 is preferably (although not necessarily) circular and of sufficient size to freely permit the passage of the screw therethrough.

Figure 5:
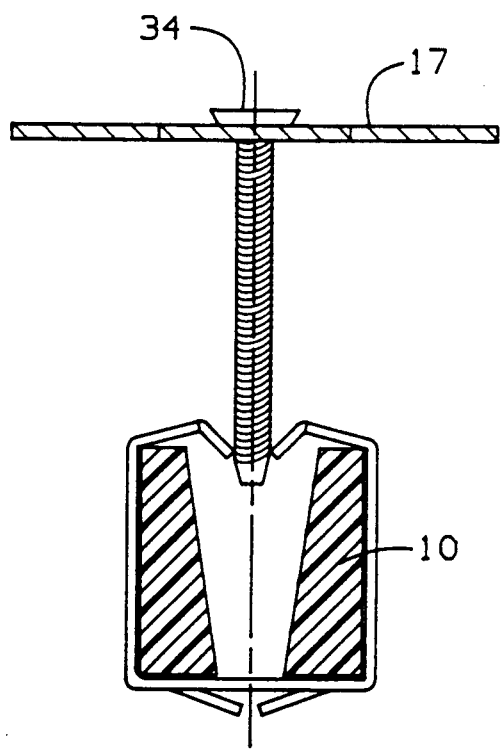
FIG. 5 is a side sectional view showing a spring clip mounted on a mounting bracket prior to complete insertion of the mounting screw.

In operation, the spring clips 19 are seated in the mounting bracket by flexing the top portions 23, 24 outwardly until the ears 25, 26 snap into opening 31. It will be seen, however, that as a result of the oblique angle of top portions 23, 24 to side portions 21, 22, the top portions will not rest upon top surface 30, but will be maintained at an angle a short distance above top surface 30 as seen in FIG. 5. When in position, the clip 19 will snugly engage the mounting bracket thereby locking the clip 19 in place.

Once the clips 19 have been locked in place, the wired electrical device 11 is positioned within the wiring box 10 such that openings 18 in brackets 17 overlie the space between each of the respective set of ears 25, 26. Once the electrical device 11 is in place, mounting screws 34 are simply manually inserted through opening 18 into the space between ears 25, 26 and pushed downwardly into opening 33.

Because the respective space between the ears 25, 26 and the size of the opening 29 are slightly smaller than the diameter of the screw 34, insertion of the screw 34 will cause the ears 25, 26 and tabs 27, 28 to deflect downwardly, thereby creating a resilient tension which urges the ears 25, 26 and tabs 27, 28 into engagement with the threads of the screw.

Figure 6:
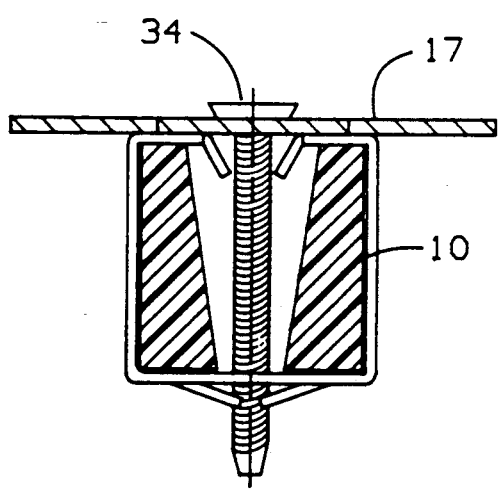
FIG. 6 is a side sectional view showing a spring clip mounted on a mounting bracket after the mounting screw has been inserted and pushed tight.

It will be seen from FIG. 6, that once the screw has been fully inserted into the spring clip 19 such that the underside of bracket 17 contacts top portions 23, 24, further downward pressure upon the screw 34 will cause top portions 23, 24 to deflect downwardly and inwardly until in contact with the top surface 30. This creates additional resilient tension with the spring clip which further secures contact with the screw 34. It will further be seen that in order to remove the screw 34, it will have to be rotated in a normal fashion to reverse it from the clip 19. The bottom surface 32 of the mounting bracket acts as a stop against the deformation of tabs 27, 28 inwardly of the plane of base portion 20, thereby preventing removal of the screw by longitudinal force and strengthening the engagement of the screw against being pulled out.

While I have described the preferred embodiment of my invention, it will be apparent to those of ordinary skill in the art that other embodiments may be possible within the scope of my invention.

What is claimed is:

1. In an electrical wiring box for mounting an electrical device therein by one or more screws, having opposed clip mounting brackets and one or more resilient screw-receiving clips, the improvement wherein each of said clips comprises:
   (a) a base portion having an opening defined by a pair of downwardly disposed tabs; and
   (b) a pair of inwardly extending top portions each having inner ends positioned adjacent one another; said inner ends being disposed downwardly and inwardly of said clip to define a screw-receiving space therebetween, said space between said top portions being aligned with said opening in said base portion.

2. The apparatus according to claim 1, wherein said top portions of said clip are disposed at an oblique angle to the plane of said base portion such that said top portions extend inwardly, upwardly of said clip.

3. In an electrical wiring box for mounting an electrical device therein by one or more screws, having opposed clip mounting brackets and one or more resilient screw-receiving clips, the improvement wherein each of said clips comprises:
   (a) a base portion having a centrally located first opening defined by a pair of downwardly disposed tabs formed in said base portion;
   (b) a pair of side portions extending one each from either end of said base portion generally perpendicularly to said base portion; and
   (c) a pair of top portions extending one each from said pair of side portions opposite of said base portion and inwardly of said clip at an oblique angle to each of said respective side portions, said top portions having inner ends positioned adjacent one another, said inner ends being disposed inwardly and downwardly of said clip to define a screw-receiving space aligned with said opening in said base portion.

4. In an electrical wiring box for mounting an electrical device therein by one or more screws, means for engaging each of said screws, comprising:
   (a) a mounting bracket having a top surface and a bottom surface, each of said surfaces defining an aligned opening; and
   (b) a resilient screw-receiving spring clip comprising a base portion having a centrally located first opening defined by a pair of downwardly disposed tabs formed in said base portion, a pair of side portions extending one from either end of said base portion generally perpendicular to said base portion, and a pair of top portions extending one each from said pair of side portions opposite said base portion and inwardly of said clip at an oblique angle to each of said respective side portions, said top portions having inner ends positioned adjacent one another, said inner ends being disposed inwardly and downwardly of said clip to define a screw-receiving space aligned with said opening in said base portion, wherein said spring clip surrounds said mounting bracket and said inner ends of said top portions of said clip extend into said opening in said top surface of said bracket.

* * * * *